(12) United States Patent
Niedermeier et al.

(10) Patent No.: US 11,649,856 B2
(45) Date of Patent: May 16, 2023

(54) BALL BEARING CAGE AND BALL BEARING

(71) Applicant: GEBR. REINFURT GMBH & CO. KG, Rimpar (DE)

(72) Inventors: Herbert Niedermeier, Poppenhausen (DE); Daniel Armani, Burggrumbach (DE); Olaf Poesse, Herrenberg (DE); Holger Schurz, Zell (DE)

(73) Assignee: Gebr. Reinfurt GmbH & Co. KG, Rimpar (DE)

( * ) Notice: Subject to any disclaimer, the term of this patent is extended or adjusted under 35 U.S.C. 154(b) by 0 days.

(21) Appl. No.: 17/046,427

(22) PCT Filed: Apr. 8, 2019

(86) PCT No.: PCT/DE2019/100323
§ 371 (c)(1),
(2) Date: Oct. 9, 2020

(87) PCT Pub. No.: WO2019/196988
PCT Pub. Date: Oct. 17, 2019

(65) Prior Publication Data
US 2021/0108680 A1   Apr. 15, 2021

(30) Foreign Application Priority Data
Apr. 10, 2018   (DE) .............................. 102018108523

(51) Int. Cl.
*F16C 33/38*   (2006.01)
*F16C 19/16*   (2006.01)
*F16C 33/41*   (2006.01)

(52) U.S. Cl.
CPC .......... *F16C 33/3806* (2013.01); *F16C 19/16* (2013.01); *F16C 33/416* (2013.01); *F16C 2220/04* (2013.01)

(58) Field of Classification Search
CPC .................. F16C 19/16; F16C 33/3806; F16C 33/41–418; F16C 2220/04; B29L 2031/04–045
See application file for complete search history.

(56) References Cited

U.S. PATENT DOCUMENTS

| 3,506,316 A | 4/1970 | McKee |
| 3,649,094 A | 3/1972 | Russell |

(Continued)

FOREIGN PATENT DOCUMENTS

| CH | 35764 A | 11/1906 |
| DE | 189257 C | 7/1906 |

(Continued)

OTHER PUBLICATIONS

6 Ways to Achieve Undercut Success in Molded Parts; "https://www.protolabs.com/resources/design-tips/6-ways-to-achieve-undercut-success-in-molded-parts/" (Year: 2016).*

(Continued)

*Primary Examiner* — Alan B Waits
(74) *Attorney, Agent, or Firm* — Laurence A. Greenberg; Werner H. Stemer; Ralph E. Locher

(57) ABSTRACT

A ball bearing cage has a radially encircling, annular body, on which in the circumferential direction, substantially evenly distributed, axially projecting webs having a predefinable axial length are arranged. The webs form a plurality of axially open ball pockets on one side for accommodating a corresponding number of balls having a predefinable ball diameter. At least for one web, a guide section is formed to bring same into an engagement with a running groove of a ball bearing ring. The axial length of the webs corresponds to at least the ball diameter. There is also described a ball bearing having such a ball bearing cage.

17 Claims, 14 Drawing Sheets

(56) References Cited

U.S. PATENT DOCUMENTS

| | | | |
|---|---|---|---|
| 5,387,041 A | 2/1995 | Lederman | |
| 5,749,661 A | 5/1998 | Moller | |
| 5,941,704 A | 8/1999 | Arai et al. | |
| 5,981,448 A * | 11/1999 | Matsui | C10M 143/00 |
| | | | 508/101 |
| 10,161,450 B2 | 12/2018 | Kamamoto et al. | |
| 10,197,096 B2 | 2/2019 | Niedermeier | |
| 2012/0087612 A1 | 4/2012 | Maeda et al. | |

FOREIGN PATENT DOCUMENTS

| | | | | |
|---|---|---|---|---|
| DE | 2063220 A1 | | 7/1971 | |
| DE | 2616019 A | * | 10/1977 | |
| DE | 29602481 U1 | | 3/1996 | |
| DE | 102014008763 B4 | | 2/2016 | |
| DE | 102015214850 A1 | | 12/2016 | |
| DE | 102017105019 A1 | | 9/2017 | |
| GB | 1594582 A | | 7/1981 | |
| JP | H08270656 A | | 10/1996 | |
| JP | 2000205268 A | * | 7/2000 | ......... F16C 33/3806 |
| JP | 2000205268 A | | 7/2000 | |
| JP | 2008164094 A | * | 7/2008 | ......... F16C 33/3806 |
| JP | 2008164094 A | | 7/2008 | |
| JP | 2008249108 A | * | 10/2008 | ............ F16C 33/416 |
| JP | 2017194141 A | * | 10/2017 | |

OTHER PUBLICATIONS

Machine Translation of DE-2616019-A (Year: 1977).*
Machine Translation of JP-2017194141-A (Year: 2017).*
Machine Translation of JP-2008164094-A (Year: 2008).*

* cited by examiner

BALL BEARING CAGE AND BALL BEARING

BACKGROUND OF THE INVENTION

Field of the Invention

The invention relates to a ball bearing cage and to a ball bearing having such a ball bearing cage.

Roller bearings are bearings in which bodies rolling between a so-called inner race and an outer race, that is to say roller bodies, reduce frictional resistance. Said roller bearings serve as a fixing for axles and shafts, wherein said roller bearings, depending on the construction mode, absorb radial and/or axial forces and simultaneously enable the shaft or the components which are thus mounted on an axle, for example a wheel, to rotate.

Ball bearings are a sub-group of such roller bearings, in which balls serve as roller bodies (other sub-groups of roller bearings include, for example, cylindrical roller bearings, tapered roller bearings, needle bearings, spherical roller bearings, or toroid roller bearings—each having corresponding roller bodies such as cylindrical rollers, tapered rollers, etc.).

Ball bearing cages for arranging the individual balls of a ball bearing, or of a ball set (that is to say all balls disposed in a circumferential sequence in a ball bearing) of a ball bearing, are likewise known and have the task of keeping in position the balls (of the ball set in the ball bearing) at approximately identical spacings in the circumferential direction of the ball bearing. In the process or to this end, the balls are in each case received in so-called ball pockets which are configured by the ball bearing cage.

Various embodiments of such ball bearing cages are also known, such as, for example, window cages (at times also referred to as solid cages) and single-part (FIG. 14) or two-part snap-fit cages.

The roller bodies, that is to say the balls, in the case of a window cage of a ball bearing are inserted in closed profiles, that is to say the ball pockets, which are configured—typically in an integral manner—by the window cage.

In contrast, the balls in the case of a snap-fit cage of a ball bearing (FIG. 14) are held in position by webs which are disposed so as to axially protrude on an annular body, a so-called cage back, and distributed in a substantially uniform manner in the circumferential direction of the ball bearing. In such a snap-fit cage, in each case two webs which are disposed neighboring one another in the circumferential direction of the ball bearing herein configure a ball pocket for receiving a or the ball, the snap-fit opening—because it is not configured as a closed profile—thereof, that is to say the 'free' spacing between two web ends which neighbor one another in the circumferential direction of the ball bearing being typically smaller than a respective ball diameter of the ball received in the ball pocket (the mean spacing in the circumferential direction between in each case two webs which neighbor one another in the circumferential direction corresponds approximately to the ball diameter), on account of which the ball pocket or the ball bearing cage—when assembling the ball bearing—'snap-fits in place' by way of the ball.

Two-part snap-fit cages, in addition to the—in this instance first—cage part, that is to say the cage back which is provided with the protruding webs, provide a second cage part which forms a counterpart to said cage back and which—likewise in most instances configured as an annular part—'closes/locks' the snap-fit openings of the first cage part, thus reinforcing/stiffening the first cage part.

Riveted cages and ribbon cages are furthermore known in such ball bearing cages.

These riveted cages and ribbon cages, in a manner similar to two-part snap-fit cages, are constructed from two associated cage parts which in this case are substantially symmetrical, each cage part thereof configuring or 'contributing' in each case one half of a ball pocket and said cage parts—once joined together—forming the complete ball pockets. Riveted cages are present when the two cage parts of such ball bearing cages are riveted to one another (in each case between two ball pockets on the cage back); ribbon cages are present when the two cage parts are 'stapled' (there).

Ball bearing cages can be produced from various materials-depending on the use of the respective ball bearing cage or the ball bearing and on related requirements such as rotating speed and/or friction—such as steel or plastics material.

Snap-fit cages, ribbon cages and riveted cages for ball bearings from steel (steel-sheet cages) are in most instances used in motor mountings and are highly suitable in the case of low to medium rotating speeds or in the case of requirements pertaining to a low frictional torque.

In the case of applications in the high-speed range, that is to say at rotating speed characteristic values of $n \times dm \geq 1,000,000$ mm/min (wherein n corresponds to the rotating speed of the inner race and dm corresponds to the mean diameter of the bearing, wherein the mean diameter of the bearing dm is calculated from the sum, divided by two, of the external diameter and the bore diameter), ball bearings having special internal geometries are often used, said ball bearings possessing a snap-fit cage from a high-performance plastics material such as polyether ether ketone (PEEK).

These plastics-material (snap-fit) cages of such high-speed ball bearings are made by subtractive shaping for reasons of precision and are therefore significantly more expensive in terms of production in comparison to the mentioned steel cages which are stamped and formed parts.

FIG. 14 shows a plastics-material (snap-fit) cage of a ball bearing in a standard design which—instead of the expensive production by subtractive shaping—is also producible by injection-molding.

The manufacturing of a plastics-material (snap-fit) cage of this type by injection-molding however inevitably leads to inaccuracies on the plastics-material (snap-fit) cage which result in significant deficiencies in the performance in a high-speed ball bearing.

The reasons therefor, that is to say for the inaccuracies, are to be found in the concept of the injection-molding tool.

The ball pockets of the plastics-material (snap-fit) cage, said ball pockets having to be incorporated in a radial manner, for reasons of the demolding capability of the plastics-material (snap-fit) cage have to be implemented by way of displaceable slides, on account of which non-uniform shrinkages arise when the injection-molded part cools down, this being associated with the additional phenomenon of flash being formed.

A ball bearing equipped with a plurality of balls, having an inner race, an outer race, and a ball bearing cage which receives the balls is known from DE 10 2017 105 019 A1.

The ball bearing cage therein provides a cage back on which webs protruding axially by way of a predefined axial length are disposed in the circumferential direction, said webs configuring a number of unilaterally axially open ball pockets for receiving the balls. Guide portions are configured on radial internal sides of the webs for the purpose of being able to engage with a running groove of a ball bearing inner race.

In order to reduce a rotational resistance in the ball bearing in that a decollation of lubricating grease which is situated in an annular space between the inner race and the outer race is minimized as far as possible, it is provided according to DE 10 2017 105 019 A1 that the axial length of the webs corresponds to 30% or more and 50% or less of the diameter of the balls.

The invention is based on the object of overcoming the disadvantages and limitations in the prior art.

SUMMARY OF THE INVENTION

The invention is in particular based on the object of conceiving a new cage design for a ball bearing cage which guarantees positive properties in terms of performance in the ball bearing, in particular with respect to friction, noise and service life. A simple tool concept is also intended to be implementable by way of the new cage design of the ball bearing cage, such that the accuracies of the ball bearing cage upon demolding from the injection-molding tool are significantly improved. The new cage design for a ball bearing cage is moreover to meet the requirements set for a high-speed bearing.

These objects are achieved by a ball bearing cage as well as by a ball bearing having the features according to the respective independent patent claim.

The ball bearing cage provides a radially encircling annular body ('cage back') on which are disposed webs which—in the circumferential direction of the ball bearing cage or of the radially encircling annular body or cage back—are distributed in a substantially uniform manner and protrude axially by way of a predefinable axial length, said webs configuring a plurality of unilaterally axially open ball pockets for receiving a corresponding number of balls having a predefinable ball diameter.

The—predefinable—axial length of the webs here corresponds to at least the ball diameter of the ball to be received or which has been received in the ball pocket. Said axial length corresponds in particular approximately to the ball diameter of the ball to be received or which has been received in the ball pocket, optionally plus an 'excess'.

As a whole in particular, however, the—predefinable—axial length of the webs is dimensioned in such a manner that a web—having the axial excess—'protrudes' axially beyond the ball so far that the web—if the ball bearing cage is assembled in a ball bearing (composed of the ball bearing outer race, the ball bearing inner race (including the ball set)—protrudes axially into the region which is radial in relation to a second, (axially) 'distal' shoulder of one of the ball bearing races (the first, (axially) 'proximal' shoulder of the ball bearing inner race or the ball bearing outer race in axial terms lies in the region which is radial in relation to the cage back of the ball bearing cage), or protrudes axially into the region which in radial terms is between the second, (axially) 'distal' shoulders of both ball bearing races (that is to say of the ball bearing inner race and the ball bearing outer race).

That is to say that the—predefinable—axial length of the webs is dimensioned in such a manner that an axially free end of a web protrudes axially into the region which is radial in relation to the second, (axially) 'distal' shoulder of the ball bearing inner race and/or the ball bearing outer race.

In short, the web in axial terms covers—at least in regions—(also) the second, (axially) 'distal' shoulder of one of the ball bearing races (that is to say of the ball bearing inner race and/or the ball bearing outer race).

If the ball bearing cage in this instance is guided in the ball bearing by the shoulder, that is to say guided by the ball bearing inner race shoulder or the ball bearing outer race shoulder, an exact concentric and stable running of the ball bearing cage can thus be guaranteed as a result—if specifically in this instance the (assembled) ball bearing cage (having 'axially long' webs of this type) is guided on both the shoulders or the two shoulders (that is to say on the first, (axially) 'proximal', and the second, (axially) 'distal' shoulder of the respective ball bearing race (that is to say of the ball bearing inner race or the ball bearing outer race).

'Approximately' herein can have the meaning that the—predefinable—axial length of the webs may be subject to manufacturing tolerances.

Expressed in simplified and illustrative terms, axially (that is to say the extent of the ball bearing cage in the axial direction) protruding webs, which are in particular substantially uniformly distributed in the circumferential direction, are in particular of substantially identical configuration and in the circumferential direction delimit the ball pockets which are able to be configured by said webs, are disposed on the annular body or the cage back.

The ball pocket which is formed by the two neighboring, axially protruding webs (the latter being spaced apart by a predefinable (radially encircling) spacing) is subjected to a further delimitation by a cup base which is configured—in the circumferential direction—between the two webs on the radially encircling, annular body.

This cup base can have a curved ('concave') face which in particular corresponds to a ball surface of the ball to be received or which has been received in the ball pocket, or have a flat ('straight') face (optionally including transitional radii in the 'straight' face).

A diameter of the curved or concave face herein can also be slightly larger than the ball diameter of the ball to be received or which has been received in the ball pocket.

If the (axially protruding) webs have the axial length of at least the ball diameter—optionally plus the 'excess'—the axial extent of the respective ball pocket configured by neighboring webs which are spaced apart in the circumferential direction ('axial depth of a ball pocket') is thus at least the ball diameter (optionally plus the 'excess').

In simple and illustrative terms, that is to say that a ball or the balls (of the ball set of the ball bearing)—in axial terms—can be completely received in the ball pocket or the ball pockets of the ball bearing cage (in the case of a corresponding spacing—in the circumferential direction of the annular body or the ball bearing cage—between in each case two webs which neighbor one another in the circumferential direction (also the 'web spacing' or the 'ball pocket width').

Moreover—in the case of a corresponding axial 'excess' in the axial length of a web—the web can optionally also be guided by the shoulder on both shoulders or the two shoulders, that is to say the first, (axially) 'proximal' shoulder and the second, (axially) 'distal' shoulder of the respective ball bearing race.

The spacing—in the circumferential direction of the annular body or of the ball bearing cage—between in each case two webs which neighbor one another in the circumferential direction, or the web spacing/the ball pocket width, herein can correspond approximately to the ball diameter—including optionally existing tolerances and optionally including a specific clearance in the ball pocket.

This 'spacing' between the two webs which neighbor one another in the circumferential direction is dimensioned, that is to say can be measured, in particular at an axial, that is to say the extent of a ball pocket in the axial direction of the ball bearing cage, center of a ball pocket ('mean axial depth of a ball pocket') as well as—approximately—at a central radial, that is to say the extent of a web in radial terms toward or away from a center point M of the ball bearing cage, height of a web or of the webs ('mean radial height of a web')—and is the length of the corresponding arc which in this respect is configured between the two webs ('mean web spacing' or 'mean ball pocket width', cf. FIG. 1).

In short, the 'mean web spacing' or the 'mean ball pocket width' between in each case two webs which neighbor one another in the circumferential direction in the case of the ball bearing cage can be approximately the ball diameter of the ball to be received or which has been received in the ball pocket—optionally plus tolerances and a clearance in the ball pocket.

The 'free' spacing between two web ends which neighbor one another in the circumferential direction of the ball bearing cage ('ball pocket opening (at the web ends)') herein can in particular in this instance also be at least the size of the respective ball diameter of the ball received in the ball pocket.

In short and in illustrative terms, the opening formed by the free web ends, or the opening width (running in the circumferential direction) of a ball pocket, or the 'ball pocket opening at the web ends', can in particular be at least the size of the ball diameter, on account of which the ball pocket or the ball bearing cage—when assembling the ball bearing—is thus (simply) push-fitted over the ball, and the snap-fitting in place (or locking) by way of the ball set, as in a conventional snap-fit cage (the 'free' spacing between two web ends which neighbor one another in the circumferential direction of the ball bearing, or the 'ball pocket opening at the web ends', here typically being smaller than a respective ball diameter of the ball received in the ball pocket) is dispensed with.

In particular for a ball bearing cage design of this type (without locking by way of the snap-fit) which—instead of the conventional snap-fitting mechanism—then requires another type of 'locking mechanism' for the ball bearing cage, said 'locking mechanism' preventing the ball bearing cage being 'axially' displaced from (out of) the ball set—and the ball bearing thus potentially 'losing' its ball bearing cage, or the ball bearing cage thus potentially 'losing' its balls, it is furthermore provided in the ball bearing cage that a guide portion for being able to engage with a running groove of a ball bearing race is configured at least in the case of one web or on one web.

Expressed in other words and in illustrative terms, if this guide portion is brought to engage with a running groove of a ball bearing race, a form-fit which is possible on account thereof thus prevents—between the guide portion and the running groove—the ball bearing cage being displaced axially from the ball bearing or axially away from the raceway, and the ball bearing thus 'losing' its ball bearing cage, or the ball bearing cage thus 'losing' its balls ('retaining function').

The guide portion herein, on the one hand, on a radial external side of the web can be configured for being able to engage with a running groove of the ball bearing outer race. Such a ball bearing in this instance can in particular be guided by a ball bearing outer race shoulder.

The guide portion, on the other hand, on a radial internal side of the web can however also be configured for being able to engage with the running groove of a ball bearing inner race. Such a ball bearing cage in this instance here can in particular be guided by a ball bearing inner race shoulder.

If the ball bearing cage is guided by a shoulder, that is to say guided by a ball bearing inner race shoulder or guided by a ball bearing outer race shoulder, exact concentric running of the ball bearing cage can thus be guaranteed on account thereof.

A guide portion—enabling the engagement with the running groove of a ball bearing race—herein can understood to be any element which—in particular by virtue of the (spatial) shape and/or forming thereof—is suitable for establishing a form-fit with a further element, in this case the running groove (of the ball bearing race or of the ball bearing inner race/outer race).

For example, such a guide portion can be a portion, in particular a rib, which is—in particular—configured so as to be integral to the web or on the web and which extends in particular substantially across an entire width of the web in the circumferential direction on the radial external side or internal side of said web.

A 'width' of a web refers in particular to the (radial) extent of said web, considered in illustrative terms an (arc) length in the circumferential direction of the ball bearing cage (cf. FIG. 1)—and can be measured on a radial external circumference of the ball bearing cage, on the mean radial height of the webs, and on a radial internal circumference of the ball bearing cage.

Such a rib or the guide portion herein can be disposed or configured approximately at the mean axial depth of a ball pocket on the web.

Such a rib or the guide portion can in particular be disposed or configured at such an axial position on the web that an axial clearance—comparable to that in 'normal' snap-fit cages—is configured at the point of engagement of the web or of the rib/the guide portion with the running groove of a ball bearing race.

Expressed in other words and in simplified terms, the guide portion or the rib can be disposed or configured in axial terms on the web such that—a 'small' (axial) air gap ((slight) axial clearance) is configured between the rib/the guide portion and the running groove or the cup base there when the guide portion or the rib 'snaps' into the running groove (when assembling the ball bearing).

That is to say that the ball bearing cage can be guided in the ball bearing by way of an axial clearance.

The retaining function on account of the form-fit can be improved when the guide portion in or on a plurality of webs, in particular in all webs, in each case is configured so as to be in particular positionally identical, having substantially identical webs, or in that in every fourth or every third or every other of the webs the guide portion in each case is configured so as to be in particular positionally identical, having substantially identical webs.

The form-fit—between the guide portion and the running groove—which prevents the ball bearing cage being displaced axially from the ball bearing or axially away from the raceway and the ball bearing thus 'losing' its ball bearing cage, or the ball bearing cage thus 'losing' its balls ('retaining function'),—in an assembled ball bearing—can be conceived so as to be permanent or arise permanently—or else can arise only when the ball bearing cage is at risk of being displaced axially from the ball bearing.

Beyond the 'pure' retaining function on account of the guide portion (by way of which retaining function or which guide portion it is prevented that the ball bearing cage is displaced axially from the ball bearing or axially away from the raceway), the guide portion—in the case of a corresponding positioning (on the web) and/or dimensioning and/or shaping of the guide portion—can additionally also assume a guiding function (that is to say that the guiding of the ball bearing cage in the running groove of the ball bearing race here takes place on account of the guide portion—cf. also a permanent form-fit) and/or a positioning function (that is to say that the axial and/or radial positioning of the ball bearing cage here takes place by way of the guide portion—cf. also a permanent form-fit).

The webs can in particular have a bi-concave shape, the bulges/curves thereof being adapted (in an 'inward' manner) to the shape of the balls ('circle/circular arc').

A great advantage of the ball bearing cage lies also in the production process thereof.

When the ball bearing cage is produced by injection-molding, the injection-molding tool, in this case a two-part injection-molding tool having an upper part and a lower part which by way of a separating joint is connected or able to be connected to the upper part—by virtue of the cage design of the ball bearing cage, here in particular with a corresponding configuration of the ball pocket without a snap-fit function (that is to say that the 'ball pocket opening at the web ends' is at least the size of the respective ball diameter of the ball received in the ball pocket)—can be embodied in a very simple manner (FIG. 13).

The guide portion herein lies in the separating joint of the two-part injection-molding tool such that complete demolding of the injection-molded part in a form-fitting manner can take place by opening the tool upper part.

A high-precision ball bearing cage can be manufactured on account of dispensing with the radially disposed slides—which to date are necessary in the case of conventional plastics-material (snap-fit) cages—and which must be considered at a uniform angular gradation in the circumferential direction according to the number of balls (and which lead to inaccuracies and generate the formation of flash).

Moreover, the tooling costs can be significantly reduced on account of the fact that the (injection-molding) tool is of very simple construction.

In the case of the ball bearing cage it also proves to be advantageous that the design thereof makes it possible for said ball bearing cage to be used also in miniature ball bearings and/or high-speed ball bearings such as typically ball bearings for dental applications, for example in dental turbines.

Besides the ball bearing cage, the ball bearing has a ball bearing inner race, a ball bearing outer race, and a multiplicity of balls having the predefined ball diameter, wherein the multiplicity of the balls corresponds to the number of ball pockets configured by the ball bearing cage—in an assembled ball bearing cage—('ball set') and one of the balls (of the ball set) is in each case received in one of the ball pockets. The guide portion—optionally a plurality of guide portions of which each is disposed on one web of the ball bearing cage—engages/engage with a running groove of the ball bearing inner race or of the ball bearing outer race.

Such a ball bearing—having the ball bearing cage—can in particular be a radial grooved ball bearing, an angular contact bearing, an axial grooved ball bearing, an angular ball bearing, a four-point bearing or a tapered ball bearing.

The ball bearing cage can at least in part, in particular completely, be composed of plastics material, in particular of polyether ether ketone (PEEK), polyether ketone (PEK), polyphenylene sulfide (PPS), polyphenol sulfone (PPSU), polyamide imide (PAI), polyimide (PI) or phenol formaldehyde resin (PF), in particular phenol formaldehyde resin (PF) reinforced with a woven cotton fabric.

It can also be provided that the ball bearing cage in the ball bearing is embodied as a cage guided by the inner race, or as a cage guided by the outer race, in particular as a cage guided by the inner race. An external circumference of the ball bearing cage herein slides on an internal circumference of the outer raceway, or an internal circumference of the ball bearing cage slides on an external circumference of the inner raceway.

The ball bearing outer race (also referred to as the outer raceway) and/or the ball bearing inner race (also referred to as the inner raceway) can be manufactured, for example, from chromium steel such as, for example, from 100Cr6 (material designation 1.3505), a steel having a content of approx. 1% carbon and 1.5% chromium. Further potential steel types—for the outer raceway and/or inner raceway—are, for example, 100CrMn6 and 100CrMo6; the alloy elements manganese (Mn) and molybdenum (Mo) here serve for improving the through-hardening capability.

For applications of the ball bearing in a corrosive environment the high-alloy steel types X65Cr13 (material designation 1.4037) and X105CrMo17 (material designation 1.4125) or X30CrMoN15-1 (material designation 1.4108) can also be used—in the inner raceway and/or outer raceway. The latter type of steel can also be used in the human organism, at least for a few days.

The ball bearing for particular operating conditions can also be provided as a hybrid bearing (two materials) in which the bearing rings or the bearing raceways are composed of steel and the balls are composed of ceramics, for example for spindle bearings for machine tools, or as ceramic bearings in which the raceways as well as the balls are composed of ceramics, or else as plastics-material bearings having balls of glass or ceramics against aggressive acids or bases in the chemical or foodstuff industry.

Preferred refinements of the invention are also derived from the dependent claims. Refinements relate to the ball bearing cage as well as to the ball bearing.

It can thus be preferably provided that the guide portion is configured on a radial external side of the web for the purpose of being able to engage with a running groove of a ball bearing outer race, or that the guide portion is configured on the radial internal side of the web for the purpose of being able to engage with a running groove of a ball bearing inner race.

It can furthermore also be provided that the guide portion is configured so as to be integral to the web, in particular on such an axial position on the web that the ball bearing cage can be guided with an axial clearance in the ball bearing.

According to one further preferred refinement, it is provided that in a or at a plurality of webs, in particular in all webs, the guide portion in each case is configured so as to be in particular positionally identical, having substantially identical webs, or that in the case of every fourth or every third or every other of the webs the guide portion in each case is configured so as to be in particular positionally identical, having substantially identical webs.

The guide portion can be configured as an elevation, in particular an elevation which extends in the circumferential direction, in particular a rib which extends in the circumferential direction.

Such a rib which extends in the circumferential direction can in particular extend substantially across the entire width of the web in the circumferential direction on the radial external side or internal side of said web.

In a refining manner it can also be provided that a cup base, which is configured on the radially encircling, annular body between in each case two webs which neighbor one another in the circumferential direction, has a flat or curved face.

It can preferably also be provided that the webs have a radial external face which is cylindrical in the axial direction. This design embodiment or this cage design can preferably be used in groove ball bearings in which cup lugs do not bend outward due to centrifugal forces, caused by the rotating speed, which arise in the ball bearing.

Alternatively thereto it can also be provided that the webs have a radial external face which is conical in the axial direction, in particular having a cone angle between approximately 2° and approximately 20°, in particular between approximately 7° and approximately 12°. On account thereof, the cup lugs can bend outward due to the centrifugal forces which arise on account of the centrifugal forces, caused by the rotating speed, which arise in the ball bearing, and it can be prevented that the cup lugs which in this instance are bent outward come into contact with a shoulder or a raceway of the outer race.

In a refining manner it can furthermore also be provided that the ball bearing cage is at least in part, in particular completely, composed of or produced from plastics material, in particular polyether ether ketone (PEEK), polyether ketone (PEK), polyphenylene sulfide (PPS), polyphenyl sulfone (PPSU), polyamide imide (PAI), polyimide (PI), or phenol formaldehyde resin (PF), in particular phenol formaldehyde resin (PF) reinforced with a woven cotton fabric.

In one refinement it can also be provided that the ball bearing cage is composed of a wear-resistant or a friction-modified material.

In a refining manner it can furthermore also be provided that a spacing, on an external circumference of the ball bearing cage, of the in each case two webs which neighbor one another in the circumferential direction (the web spacing or the ball pocket width) is larger than a spacing of the two webs on an internal circumference of the ball bearing cage.

This dissimilar dimensioning of the spacings (of the ball pocket width) on the internal circumference and the external circumference in particular in this instance leads to the ball pockets which are configured in the ball bearing cage having in each case dissimilar ball pocket widths (in the circumferential direction) on the external circumference and the internal circumference of the ball bearing cage (ball pocket having a 'funnel shape').

Such a cage design—having a dissimilar ball pocket width (or web spacing) on the external circumference and the internal circumference of the ball bearing cage—(and the production of said cage design) is described in DE 10 2014 008 763 B4 (Gebrüder Reinfurt GmbH & Co. KG), Dec. 17, 2015 (date of disclosure), paragraphs [0018] et. sq.—with FIGS. 5 to 7 and 10 or FIGS. 15 to 17 and 20 therein, in particular for a single-part snap-fit cage guided by an inner race or an outer race the contents of said document thus being incorporated as an component part of the present embodiments (in DE 10 2014 008 763 B4 described as 'the length of the ball pocket on the external circumference of the ball bearing cage is larger than the length of the ball pocket on the internal circumference of the ball bearing cage.' (cf. [0028] of DE 10 2014 008 763 B4).

It can furthermore also be provided that the (web) spacing or the mean web spacing—in the circumferential direction of the annular body or of the ball bearing cage—between in each case two webs which neighbor one another in the circumferential direction corresponds approximately to the ball diameter—including optionally existing tolerances and optionally including a specific clearance in the ball pocket.

It can furthermore also be provided here in this instance that the 'free' spacing between two web ends which neighbor one another in the circumferential direction of the ball bearing cage ('ball pocket opening (at the web ends)') is also the size of the respective ball diameter of the ball received in the ball pocket—including optionally existing tolerances and optionally including a specific clearance in the ball pocket.

In short and in illustrative terms, the opening that is formed by the free web ends or the opening width (which runs in the circumferential direction) of a ball pocket or the ball pocket opening at the web ends can be the size of (approximately) the ball diameter.

The opening width of the ball pocket opening at the web ends can optionally also be larger than the ball diameter so as to facilitate the ball bearing cage being push-fitted onto the ball set.

The ball bearing cage can preferably be produced or have been produced by subtractive shaping, by additive manufacturing, in particular by 3D-printing, or by injection-molding. Advantages such as simple and cost-effective tools, high-precision ball bearing cages with tight tolerances and/or dimensional deviations result in particular from the production by injection-molding.

It can preferably also be provided that the ball bearing cage is inserted in, or used in, a single-row radial grooved ball bearing.

It can also preferably be provided that the ball bearing cage is applied to or used in high-speed applications such as, for example, in dental technology, for example in a dental turbine, having a rotating speed characteristic value in the range of approximately n×dm≥1,000,000 mm/min, wherein n corresponds to a rotating speed of the inner race and dm corresponds to a mean diameter of the bearing. The mean bearing diameter dm is calculated as an average value of an external diameter and a bore diameter of the ball bearing.

In one refinement it can be provided that the balls of the ball bearing (including the ball bearing cage) have the predefinable ball diameter of less than 5 mm.

The ball bearing (and/or the ball bearing cage) can preferably be used in a dental apparatus, in particular in a dental turbine.

An injection-molding tool for the production of the ball bearing cage—by injection-molding—preferably possesses two tool parts which are able to be joined and/or separated by way of a separating joint, wherein the two tool parts in the joined state configure for the ball bearing cage a cavity ('negative mold') which replicates the ball bearing cage, wherein the guide portion lies in the separating joint.

The description of advantageous design embodiments of the invention provided to this point contains numerous features which in the individual dependent claims are in part reflected so as to be combined to form a plurality of features. However, the person skilled in the art will expediently also consider these features individually and combine the latter so as to form meaningful further combinations.

The above-described properties, features, and advantages of this invention, as well as the manner by way of which said properties, features, and advantages are achieved, will become clearer and more readily understandable in the context of the following description of one or a plurality of exemplary embodiments which will be explained in more detail in conjunction with the figures.

The invention is however not limited to the combination of features that was stated in the exemplary embodiment or exemplary embodiments, also not in terms of functional features. To this end, suitable features of each of the exemplary embodiments can thus also be explicitly considered individually, removed from one exemplary embodiment and introduced into another exemplary embodiment so as to enhance the latter.

Identical parts, components and the like are identified by the same reference signs in the figures. Chain-dotted lines highlight sections; solid (uninterrupted) lines refer to edges.

DETAILED DESCRIPTION OF THE INVENTION

EXEMPLARY EMBODIMENTS

Ball Bearing Cage 2 Having a Cylindrical or Conical External Face 26, 28, 30, and Having a Concave or Straight Cup Base 54, 66, 70 (FIGS. 1 to 3, FIGS. 4 to 6, FIGS. 7 to 9, FIGS. 10 to 12)

Figure 1:
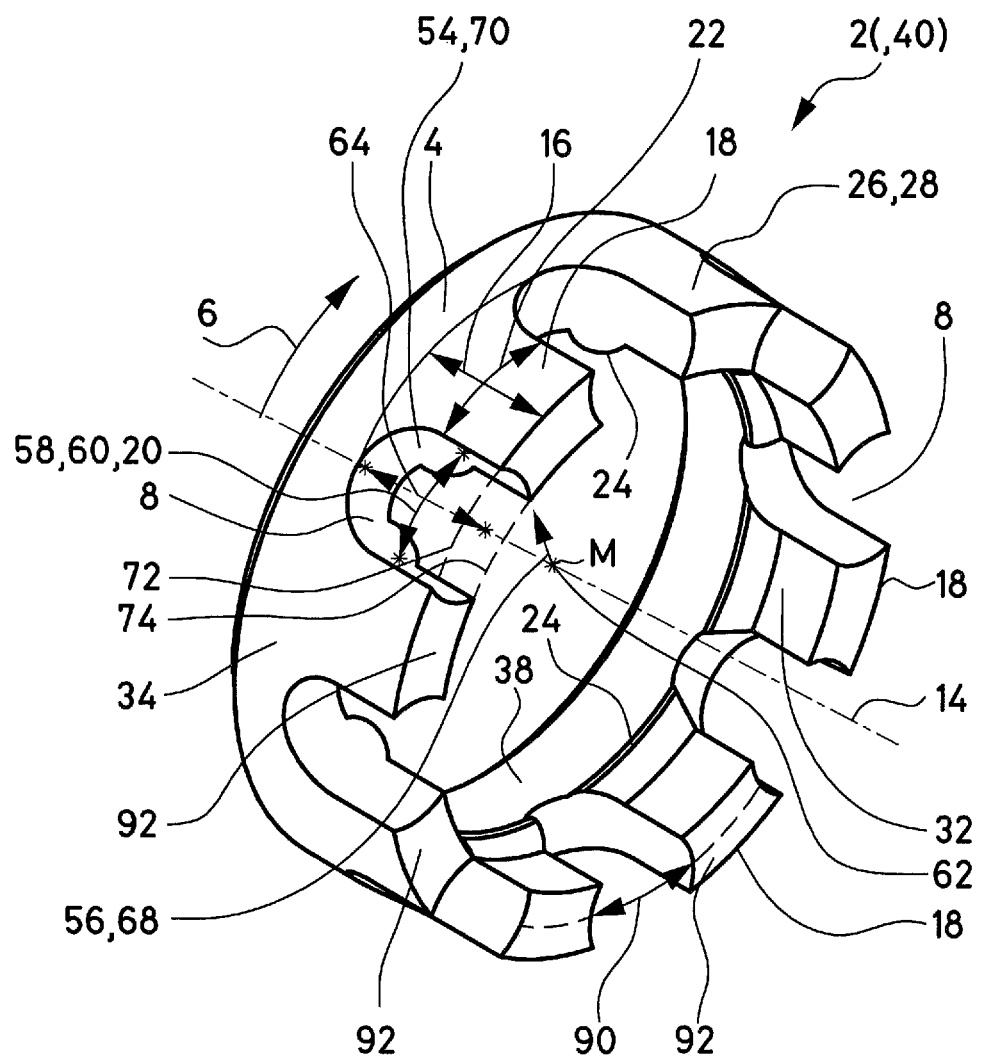
FIG. 1 shows a roller bearing cage according to a first embodiment (perspective view, cylindrical external face, cup base concave)
Figure 2:
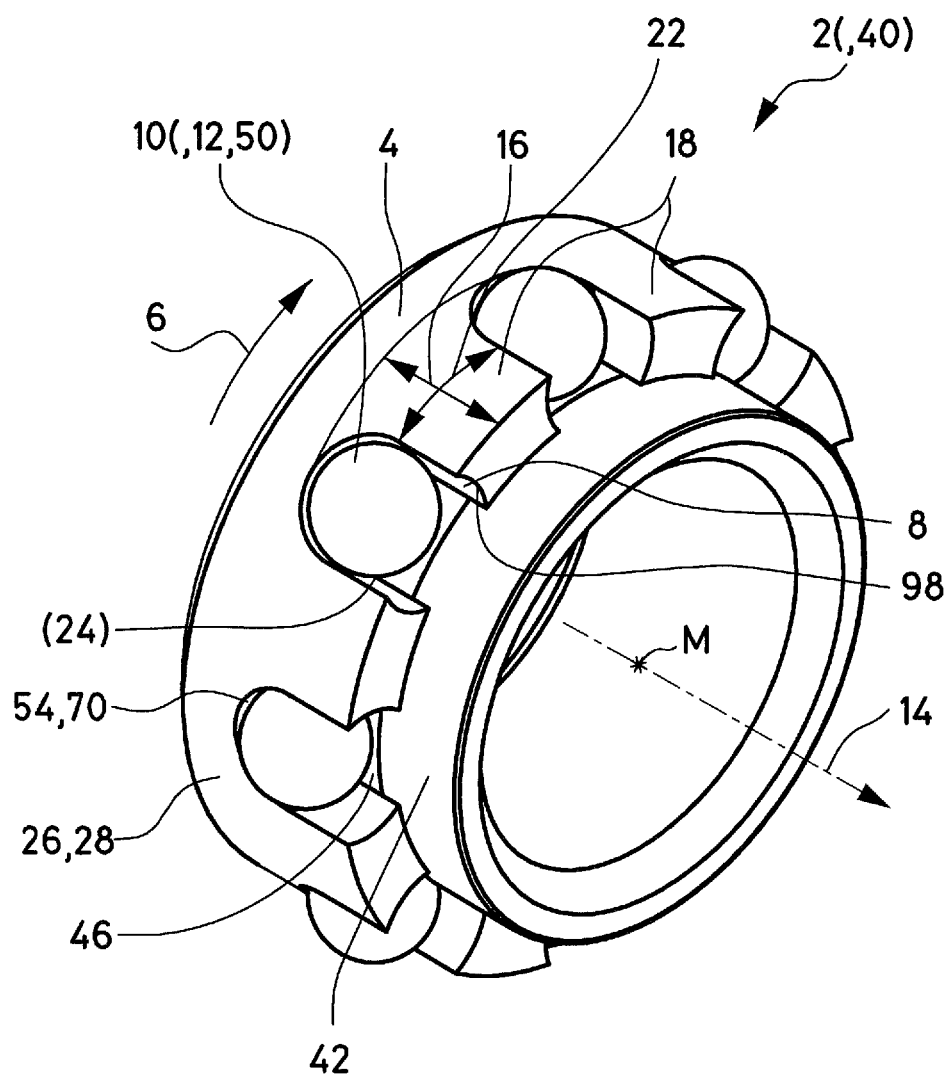
FIG. 2 shows an inner race, balls and a ball bearing cage according to the first embodiment (perspective view, cylindrical external face, cup base concave)
Figure 3:
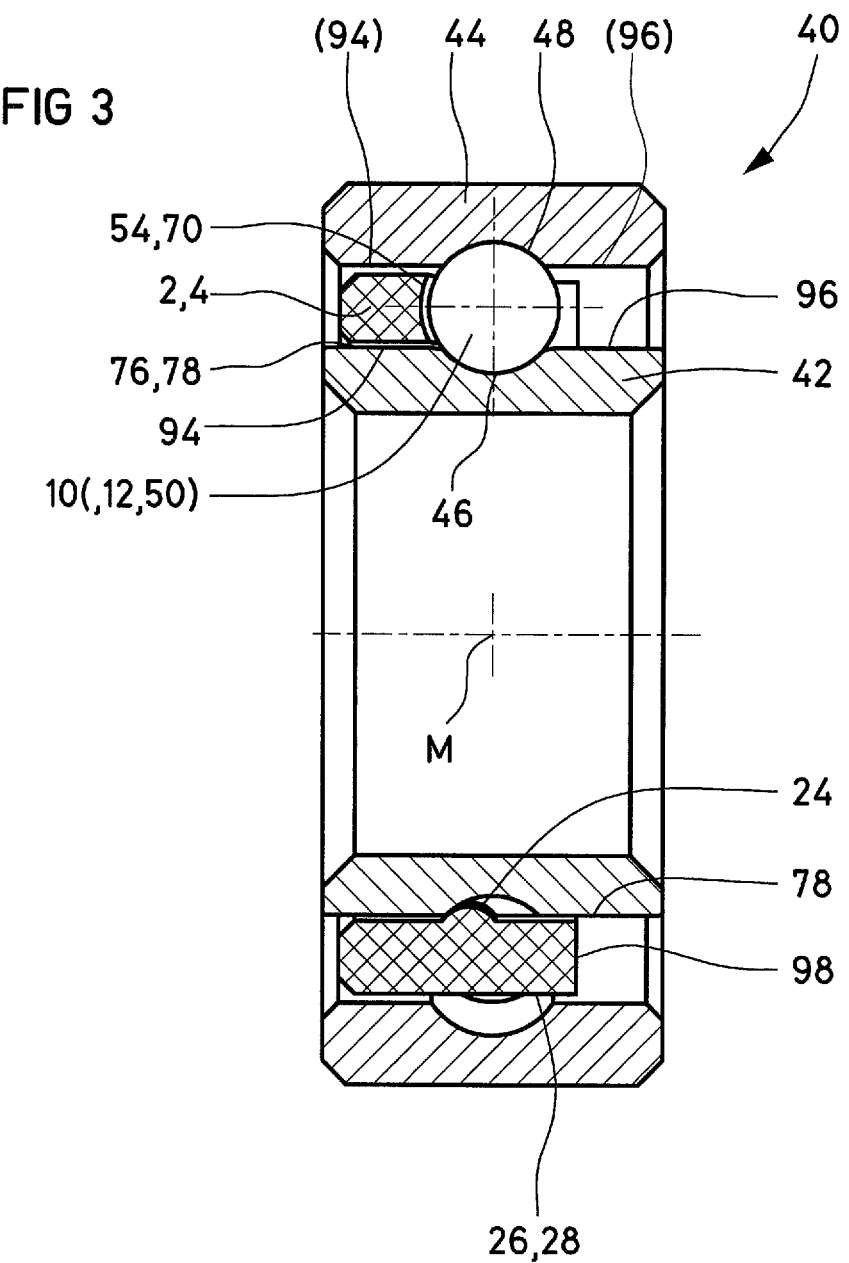
FIG. 3 shows a radial grooved ball bearing having a ball bearing cage, guided by the inner race, according to the first embodiment (sectional view, cylindrical external face, cup base concave)

FIGS. 1 to 3 show (in different functional groups, that is to say only the ball bearing cage 2 by itself, the ball bearing cage 2 having the inner race 42, and the ball bearing cage 2 installed in a single-row radial grooved ball bearing 40) a first embodiment of a ball bearing cage 2 ('ball bearing cage 2 having a cylindrical external face 28 and a concave cup base 70').

Figure 4:
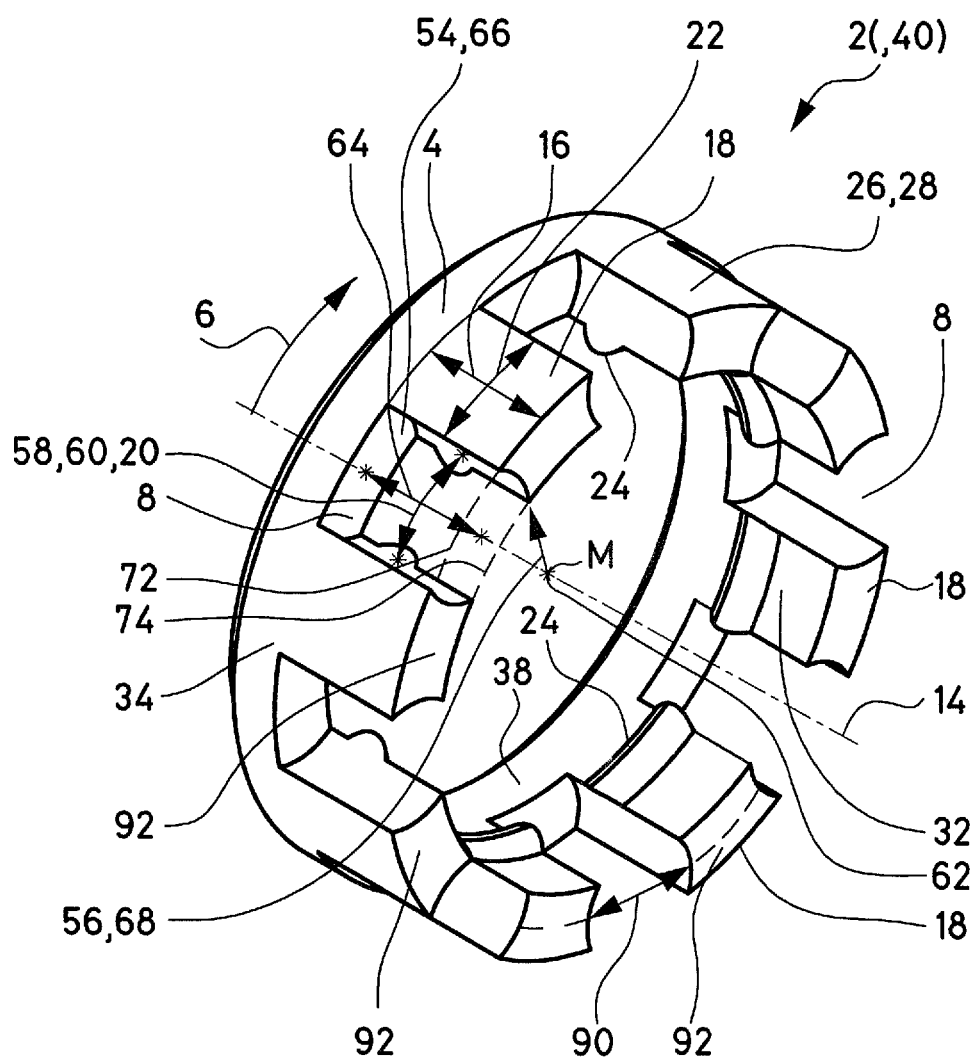
FIG. 4 shows a ball bearing cage according to a second embodiment (perspective view, cylindrical external face, cup base straight)
Figure 5:
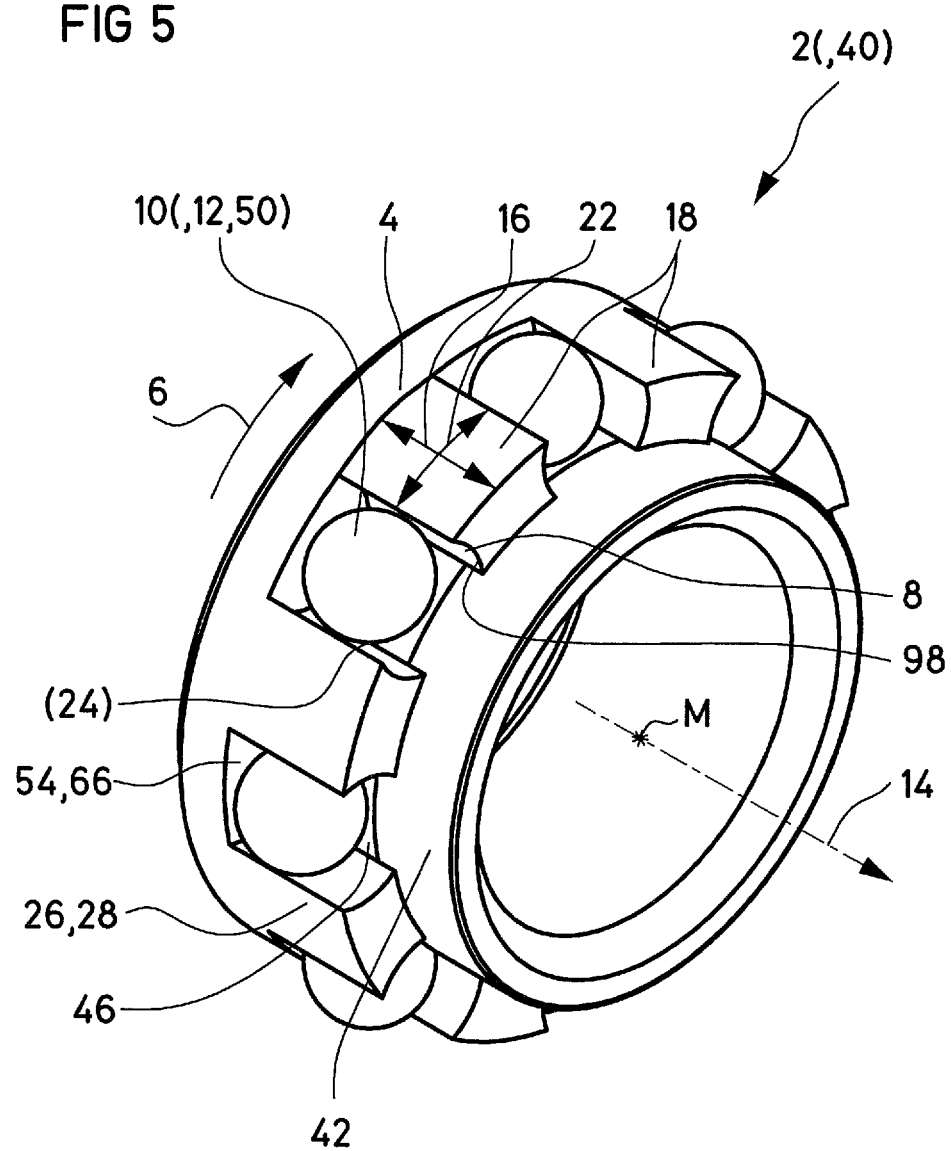
FIG. 5 shows an inner race, balls and a ball bearing cage according to the second embodiment (perspective view, cylindrical external face, cup base straight)
Figure 6:
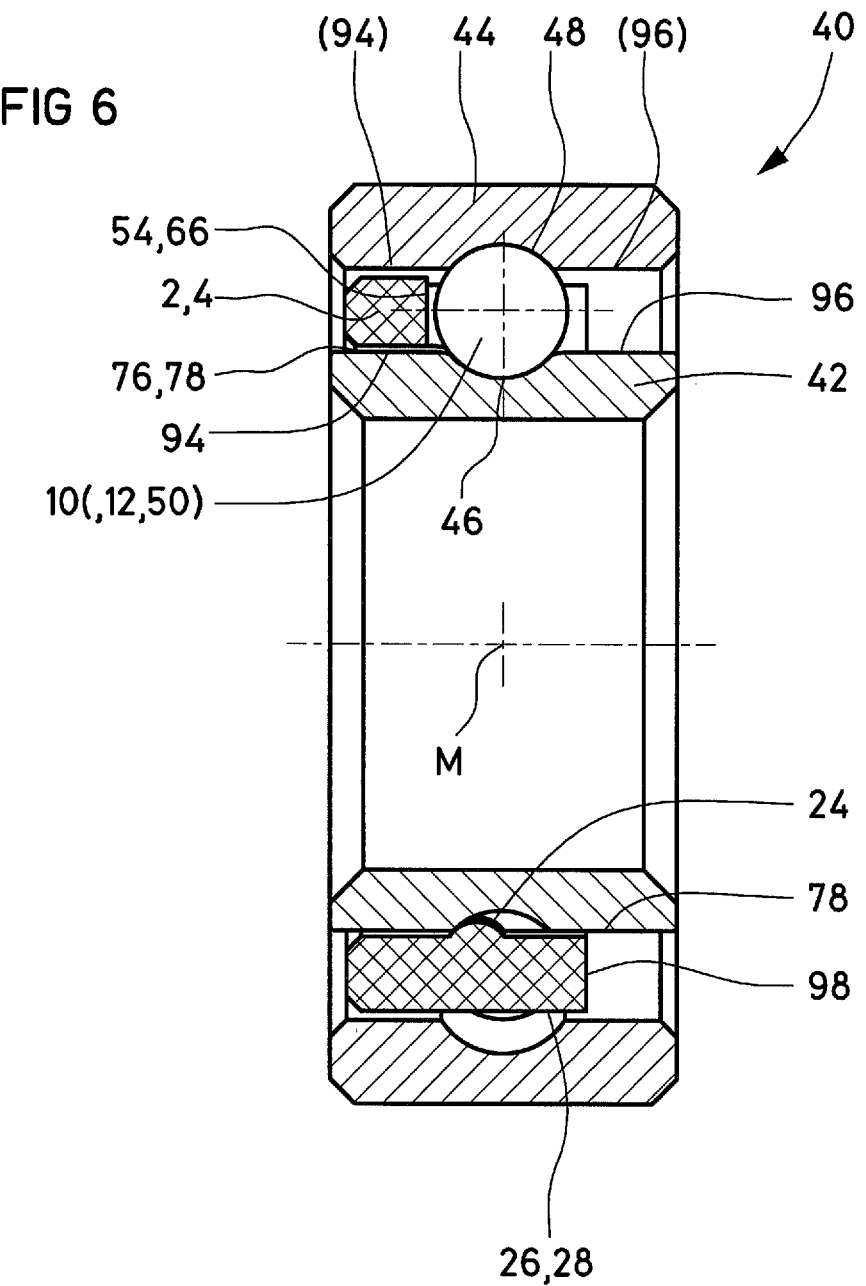
FIG. 6 shows a radial grooved ball bearing having a ball bearing cage, guided by the inner race, according to the second embodiment (sectional view, cylindrical external face, cup base straight)

FIGS. 4 to 6 show (likewise in the different functional groups, that is to say only the ball bearing cage 2 by itself, the ball bearing cage 2 having the inner race 42, and the ball bearing cage 2 installed in a single-row radial grooved ball bearing 40) a second embodiment of a ball bearing cage 2 ('ball bearing cage 2 having a cylindrical external face 28 and a straight cup base 66').

Figure 7:
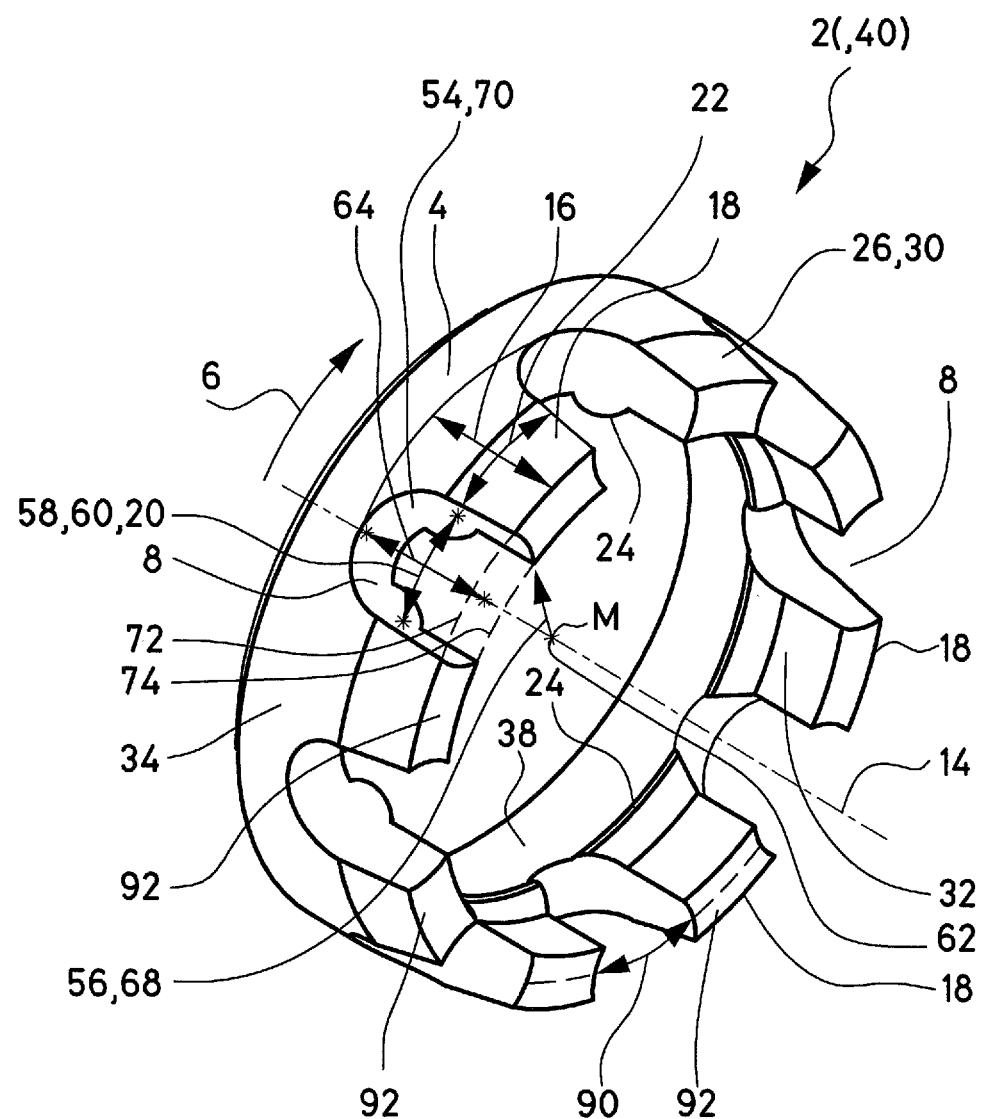
FIG. 7 shows a ball bearing cage according to a third embodiment (perspective view, conical external face, cup base concave)
Figure 8:
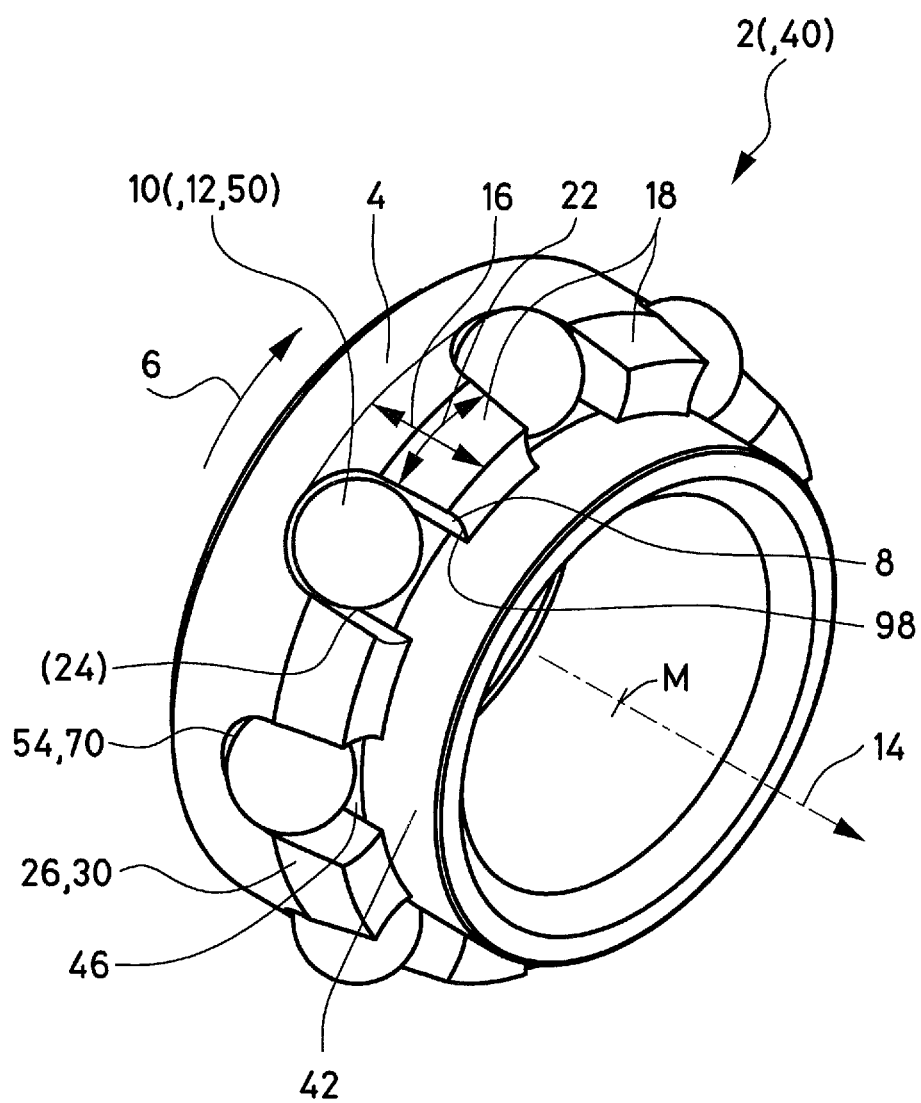
FIG. 8 shows an inner race, balls and a ball bearing cage according to the third embodiment (perspective view, conical external face, cup base concave)
Figure 9:
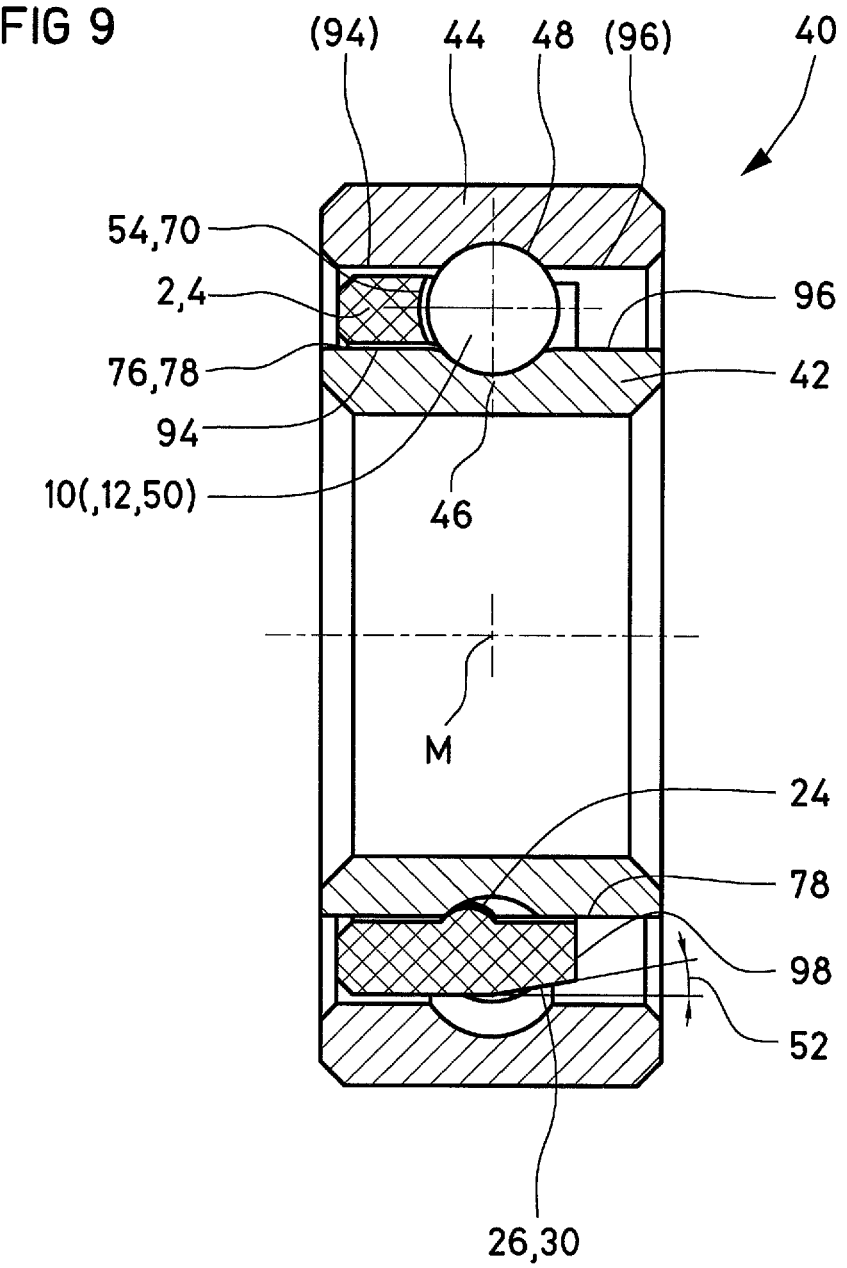
FIG. 9 shows a radial grooved ball bearing having a ball bearing cage, guided by the inner race, according to the third embodiment (sectional view, conical external face, cup base concave)

FIGS. 7 to 9 show (likewise in the different functional groups, that is to say only the ball bearing cage 2 by itself, the ball bearing cage 2 having the inner race 42, and the ball bearing cage 2 installed in a single-row radial grooved ball bearing 40) a third embodiment of a ball bearing cage 2 ('ball bearing cage 2 having a conical external face 30 and a concave cup base 70').

Figure 10:
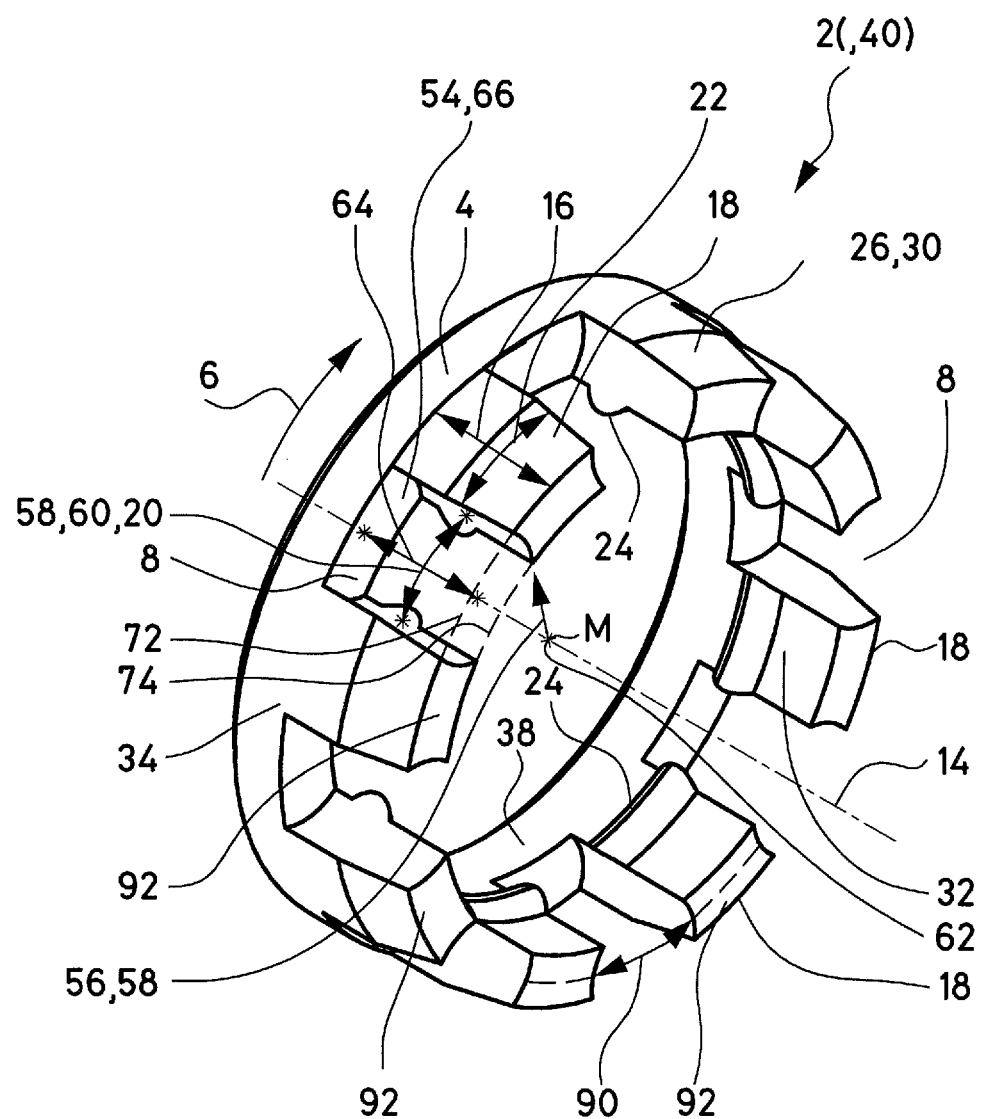
FIG. 10 shows a ball bearing cage according to a fourth embodiment (perspective view, conical external face, cup base straight)
Figure 11:
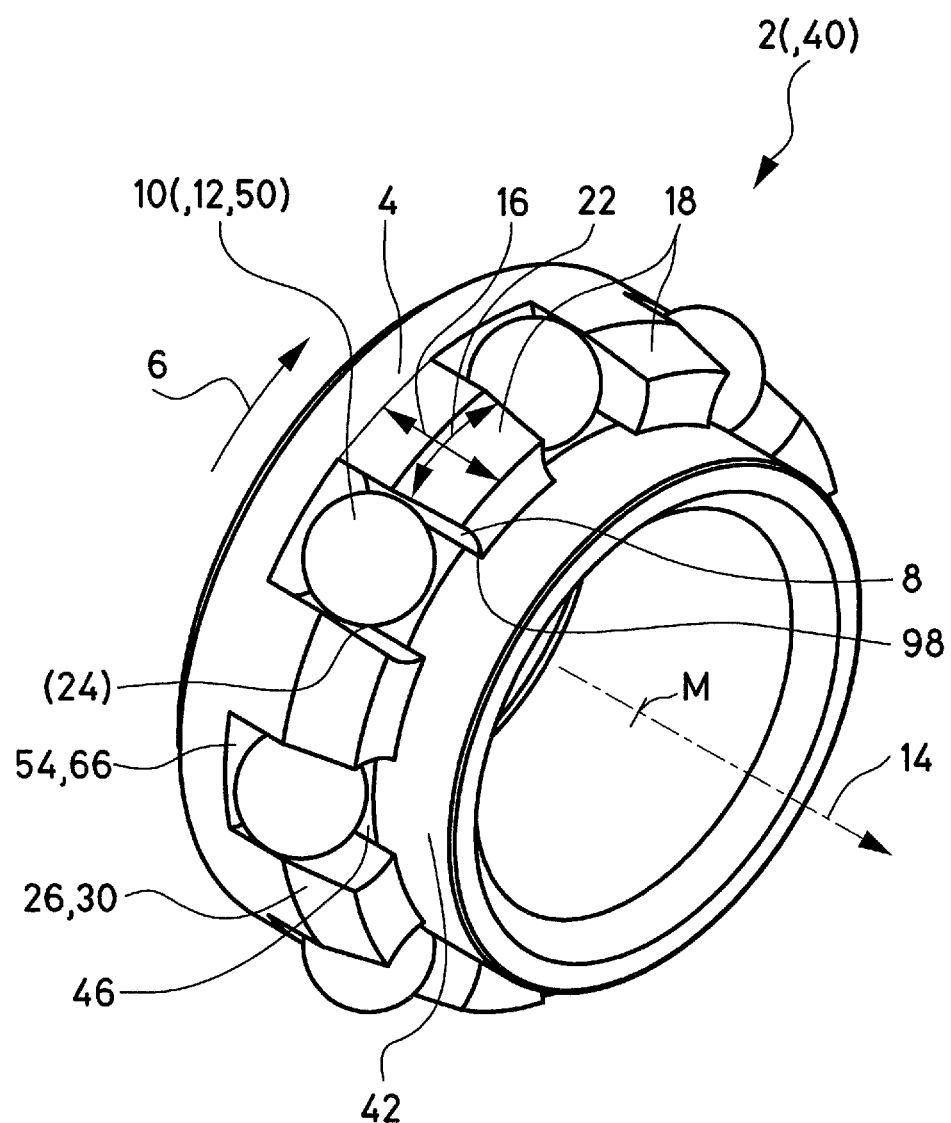
FIG. 11 shows an inner race, balls and a ball bearing cage according to the third embodiment (perspective view, conical external face, cup base straight)
Figure 12:
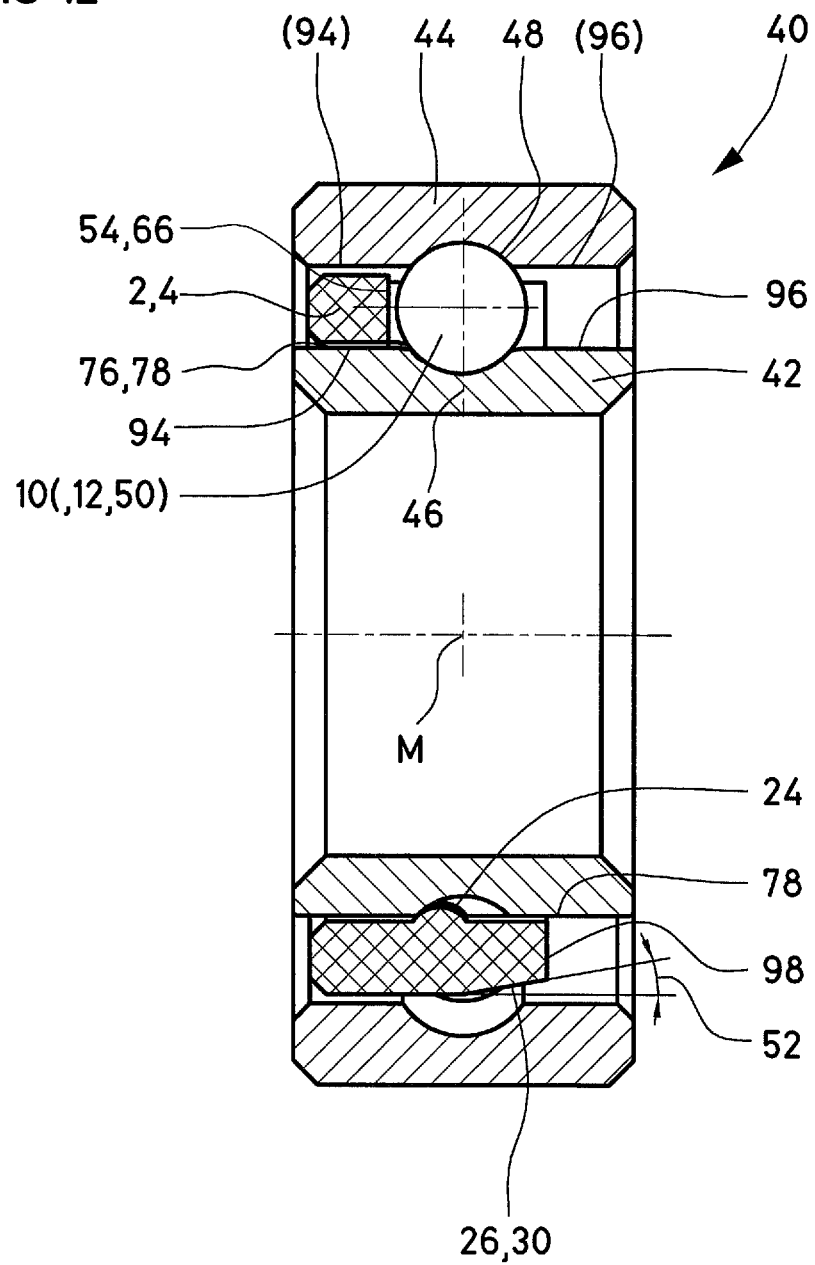
FIG. 12 shows a radial grooved ball bearing having a ball bearing cage, guided by the inner race, according to the third embodiment (sectional view, conical external face, cup base straight)

FIGS. 10 to 12 show (likewise in the different functional groups, that is to say only the ball bearing cage 2 by itself, the ball bearing cage 2 having the inner race 42, and the ball bearing cage 2 installed in a single-row radial grooved ball bearing 40) a fourth embodiment of a ball bearing cage 2 ('ball bearing cage 2 having a conical external face 30 and a straight cup base 66').

As is shown in FIGS. 1 to 12, these ball bearing cages 2 (according to all four mentioned embodiments—in short 'the ball bearing cage' or 'the/all ball bearing cages')—of an—in this case—single-row radial grooved ball bearing 40 (for the sake of simplicity hereunder in short also referred to only as the 'ball bearing')—have a radially encircling, annular body 4, the cage back 4, on which webs 18 which—in the circumferential direction 6 of the ball bearing cage 2 or of the cage back 4 (in short only 'in a or in the circumferential direction' 6)—are distributed in a substantially uniform manner, which are configured identically to one another and which protrude axially 14 by way of a predefinable axial length 16 are disposed, said webs configuring a plurality of unilaterally axially 14 open ball pockets 8 for receiving a corresponding number of balls 10 having a predefinable ball diameter 12.

As is shown or highlighted in FIGS. 1 to 12, the webs 18—in the cross section—are bi-concave, wherein the bulges/curves thereof on both sides are adapted (in an 'inward' manner) to the shape of the balls 10 ('circle/circular arc').

Each configured ball pocket 8 of the ball bearing cage 2 here receives one ball 10. All balls 10 received in the configured ball pockets 8 of the ball bearing cage 2 are also referred to in their entirety as a ball set 50 (of the ball bearing or of the single-row radial grooved ball bearing 40).

The—predefinable—axial length 16 of the webs 18 in the ball bearing cages 2 here corresponds approximately to the ball diameter 12 of the balls 10 to be received (cf. FIGS. 1, 4, 7 and 10) or which have been received in the ball pocket 8, plus an excess 98 (cf. FIGS. 2, 5, 8 and 11, as well as 3, 6, 9 and 12).

As is also shown in FIGS. 3, 6, 9 and 12, the excess 98 or the axial length 16 of the webs 18 in the ball bearing cages 2 is dimensioned in such a manner that the webs 18 protrude in each case axially into the region which is radial in relation to the second, (axially) 'distal' shoulder 96 of the ball bearing inner race 42 (the first, (axially) 'proximal' shoulder 94 of the ball bearing inner race 94 lies axially in the region which is radial in relation to the cage back 4 of the ball bearing cage 2) protrude (or protrude axially into the region which is radially between the second, (axially) 'distal' shoulder 96 of the ball bearing inner race 42 and the second, (axially) 'distal' shoulder 96 of the ball bearing outer race 44).

That is to say that the—predefinable—axial length 16 of the webs 18 is dimensioned in such a manner that the axially free ends 92 of the webs 18 protrude into the region which is radial in relation to the second, (axially) 'distal' shoulder 96 of the ball bearing inner race 42 (or lie axially in the region which is radial between the second, (axially) 'distal' shoulder 96 of the ball bearing inner race 42 and the second, (axially) 'distal' shoulder 96 of the ball bearing outer race 44).

In short, the webs 18 covers in each case in axial terms—at least in regions—(also) the second, (axially) 'distal' shoulder 96 of the ball bearing inner race 42.

If the ball bearing cage 2—as in this case—is then specifically guided by the ball bearing inner race shoulder, the (assembled) ball bearing cage 2 in this instance is thus guided on both or the two shoulders 94, 94 (that is to say on the first, (axially) 'proximal' 94 and the second, (axially) 'distal' shoulder 96 of the ball bearing inner race 92.

Expressed in simplified and illustrative terms, axially 14 protruding webs 18—which are uniformly distributed in the circumferential direction 6 and of identical configuration—which in the circumferential direction 6 delimit the ball pockets 8 which are able to be configured by said webs 18 are disposed on the cage back 4 of the ball bearing cage 2.

As is shown in FIGS. 1 to 12, the ball pocket 8 which is formed by the respective two neighboring (spaced apart by a predefinable (radially encircling) spacing 20), axially 14 protruding webs 18 is subjected to a further delimitation by a cup base 54 which is configured—in the circumferential direction 6—between the two webs 18 on the cage back 4.

This cup base 54 can have a curved ('concave') face 70 which corresponds to a ball surface of the ball 10 to be received or which has been received in the ball pocket 8 (cf. FIGS. 1 to 3, and FIGS. 7 to 9)—or a flat ('straight') face 66 (including transitional radii) (cf. FIGS. 4 to 6, and FIGS. 10 to 10).

If, as is shown in FIGS. 1 to 12, the (axially 14 protruding) webs 8 have the axial length 16 of approximately the ball diameter 12 plus the excess 98, the axial extent 64 of the respective ball pocket 8 ('axial depth of a ball pocket', 64)—configured by the webs 18 which neighbor one another in the circumferential direction 6 (spaced apart by the spacing 20)—is thus also approximately the ball diameter 12 plus the excess 98.

The ball bearing cage 2 herein is guided by the ball bearing inner race shoulder 78 (cf. FIGS. 3, 6, 9 and 12), that is to say that the internal circumference 38 or the internal circumferences 38 of the ball bearing cages 2 slide on the external circumference or the external circumferences 76 of the inner raceways 42 of the ball bearings 40, that is to say on the first, (axially) 'proximal' shoulder 94 of the inner raceway 42 and the second, (axially) 'distal' shoulder 96 of the inner raceway 42 such that an exact concentric and stable running of the ball bearing cage 2 (in the ball bearing 40) can be guaranteed.

In simple and illustrative terms, that is to say that a ball or the balls 10 (of the ball set 50 of the single-row radial grooved ball bearing 40) can be completely—in axial 14 terms—(and there beyond by way of the excess 98) received in the ball pocket or the ball pockets 8, of the ball bearing cage 2 (in the case of a corresponding spacing 20—in the circumferential direction 6 of the cage back 4 or of the ball bearing cage 2—between in each case two webs 18 which neighbor one another in the circumferential direction 6 ('web spacing or ball pocket width', 20)).

As is shown in FIGS. 1 to 12, the spacing 20—in the circumferential direction 6 of the cage back 4 or of the ball bearing cage 2—between in each case two webs 18 which neighbor one another in the circumferential direction 6, or the ball pocket width 20 is configured in approximately the ball diameter 12—including optionally existing tolerances and optionally including a specific clearance in the ball pocket.

This 'spacing' 20 between the two webs 18 which neighbor one another in the circumferential direction 6 is dimensioned, that is to say can be measured, in particular at an axial 14, that is to say the extent of a ball pocket 8 in the axial direction 14 of the ball bearing cage 2, center of a ball pocket 58 ('mean axial ball pocket depth', 58) as well as—approximately—on a central radial 56, that is to say the extent of a web in radial 16 terms toward or away from a center point M 62 of the ball bearing cage 2, height 60 of a web 18 or of the webs 18 ('mean radial height of a web', 60)—and is the length of the corresponding arc 20 which is configured in this respect between the two webs 18 ('mean web spacing' or 'mean ball pocket width', 20, cf. FIG. 1).

In short, the 'mean web spacing' 20 or the 'mean ball pocket width' 20 in the ball bearing cage 2 is approximately the ball diameter 12 of the ball 10 to be received or which has been received in the ball pocket 8—optionally plus tolerances and a clearance in the ball pocket.

As is shown in FIGS. 1 to 12, the 'free' spacing 90 between two web ends 92 which neighbor one another in the circumferential direction 6 of the ball bearing cage 2 ('ball pocket opening (at the web ends)', 90) is also approximately the size of the respective ball diameter 12 of the ball 10 received in the ball pocket 8.

In short and in illustrative terms, the 'ball pocket opening 90 at the web ends 92' is approximately the size of the ball diameter 12—, on account of which the ball pocket 8 or the ball bearing cage 2—when assembling the ball bearing 40—is thus (simply) push-fitted over the ball 10, and the snap-fitting into place (or locking) with the ball set 50, as in a conventional snap-fit cage (the 'ball pocket opening 90 at the web ends 92' here is typically smaller than a respective ball diameter 12 of the ball 10 received in the ball pocket 8) is dispensed with.

Since for a ball bearing cage design of this type (without locking by way of the snap-fit) in the ball bearing cage 2, which—instead of the conventional snap-fitting mechanism—then requires another type of 'locking mechanism' for the ball bearing cage 2, said 'locking mechanism' preventing the ball bearing cage 2 being 'axially' 14 displaced from (out of) the ball set 50—and the ball bearing 2 thus potentially 'losing' its ball bearing cage 2, or the ball bearing cage 2 potentially 'losing' its balls 10, it is provided in the ball bearing cage 2, as is shown in FIGS. 1 to 12, that a guide portion 24—in the form of a rib 24 which is configured so as to be integral to the web 18 or to the ball bearing cage 2 and extends across the width 22 of a web 18 (cf. FIGS. 1, 4, 7 and 10)—for being able to engage with a running groove 46, 48 of a ball bearing race 42, 44, that is to say in this case the running groove 46 of the ball bearing inner race 42, is configured on the webs 18 of the ball bearing cage 2, that is to say on the radial internal sides 32 of the webs 18, approximately in the region of the central axial ball pocket depth 58 there (cf. FIGS. 2, 5, 8 and 11, as well as 3, 6, 9 and 12).

These axial positions of the ribs 24 on the radial internal sides 32 of the webs 18—approximately in the region of the central axial ball pocket depths 58—are therefore dimensioned such that—when the webs 18 or the ribs 24 engage with the running groove 46 of the ball bearing inner race 42—an axial clearance—comparable to that in a 'normal' snap-fit cage—is configured.

When these guide portions 24 or these ribs 24 (when assembling the ball bearing 40) are brought to engage with the running groove 46 of the ball bearing inner race 42 (cf. FIGS. 2, 5, 8 and 11, as well as 3, 6, 9 and 12), a form-fit possible on account thereof—between the guide portions 24 or the ribs 24 and the running groove 46—thus prevents the ball bearing cage 2 displacing axially 14 from the ball bearing 40 or axially 14 away from the raceway/ball bearing inner race 42, and the ball bearing 40 thus 'losing' its ball bearing cage 2, or the ball bearing cage 2 'losing' its balls 10 ('retaining function').

The ball bearing cage 2 herein is guided by the ball bearing inner race shoulder 78 (cf. FIGS. 3, 6, 9 and 12), that is to say the internal circumference 38 or the internal circumferences 38 of the ball bearing cages 2 slide on the external circumference or the external circumferences 76 of the inner raceways 42 of the ball bearings 40, that is to say on the first, (axially) 'proximal' shoulder 94 of the inner raceway 42 and the second, (axially) 'distal' shoulder 96 of the inner raceway 42 such that an exact concentric and stable running of the ball bearing cage 2 (in the ball bearing 40) can be guaranteed.

The ball bearing cages 2 are produced—by means of injection-molding 36 (cf. FIG. 13)—from a high-performance plastics material, such as, for example, polyether ether ketone (PEEK), polyether ketone (PEK), polyphenylene sulfide (PPS), polyphenyl sulfone (PPSU), polyamide imide (PAI) or polyimide (PI).

The outer 44 and inner raceways 42 of the single-row radial grooved ball bearing or bearings 40 are manufactured from chromium steel, such as, for example, from 100Cr6 (material designation 1.3505), a steel type having a content of approx. 1% carbon and 1.5% chromium.

The balls 10 of the ball set 50 used in the case of the ball bearing cage or cages 2 or the ball bearings 40 have a predefinable ball diameter 12 of approx. 1 mm. The single-row radial grooved ball bearings 40 are provided for a dental application, that is to say for a dental turbine.

The ball bearing cages 2—to the extent described—beyond the design embodiment thereof to date, in particular the web design thereof having its axial extent 14 of approximately the ball diameter 12 plus the excess 98, and the guide portions 24 or the ribs 24 (cf. FIGS. 1 to 12), can additionally also have various different design embodiments in terms of the external face 26, 28, 30 and the cup base 54, 66, 70 of said ball bearing cages.

'Ball Bearing Cage 2 Having a Cylindrical External Face 28 and a Concave Cup Base 70', FIGS. 1 to 3

FIGS. 1 to 3 show (in various functional groups, that is to say only the ball bearing cage 2 by itself (FIG. 1), the ball bearing cage 2 having the inner race 42 (FIG. 2), and the ball bearing cage 2 installed in a single-row radial grooved ball bearing 40 (FIG. 3)) a first embodiment of the ball bearing cage 2 having a cylindrical external face 28 and a concave cup base 70.

As is shown in FIGS. 1 to 3, the ball bearing cage 2 according to this first embodiment or the webs 18 thereof has/have a radial external face 28 which is cylindrical in the axial direction 14.

This design embodiment or this cage design can preferably be used in grooved ball bearings in which cup lugs do not bend outward due to centrifugal forces, caused by the rotating speed, which arise in the ball bearing.

As is shown in FIGS. 1 to 3, the ball bearing cage 2 according to this first embodiment furthermore provides a cup base 54 which has a curved ('concave') face 70 which corresponds to a ball surface of the ball 10 to be received or which has been received in the ball pocket 8.

FIG. 2 shows the ball bearing cage 2—guided by the ball bearing inner race shoulder 78 according to this first embodiment conjointly with the associated ball bearing inner race 42 and the balls 10 received in the ball pockets 8.

FIG. 3 shows the—completed or fully assembled—ball bearing 40 having the ball bearing inner race 42, the ball bearing outer race 44 and the ball bearing cage 2 guided by the ball bearing inner race shoulder 78 (according to the first embodiment) as well as the balls 10 received in the ball pockets 8.

'Ball Bearing Cage 2 Having a Cylindrical External Face 28 and a Straight Cup Base 66', FIGS. 4 to 6

FIGS. 4 to 6 show (likewise in the various functional groups, that is to say only the ball bearing cage 2 by itself (FIG. 4), the ball bearing cage 2 having the inner race 42 (FIG. 5), and the ball bearing cage 2 installed in a single-row radial grooved ball bearing 40 (FIG. 6)) a second embodiment of the ball bearing cage 2 having a cylindrical external face 28 and a straight cup base 66.

As is shown in FIGS. 4 to 6, the ball bearing cage 2 according to this second embodiment or the webs 18 thereof also has/have the radial external face 28 which is cylindrical in the axial direction 14.

As is shown in FIGS. 4 to 6, the ball bearing cage 2 according to this second embodiment furthermore provides a cup base 54 which has a flat ('straight') face 66.

FIG. 5 shows the ball bearing cage 2—guided by the ball bearing inner race shoulder 78—according to this second embodiment conjointly with the associated ball bearing inner race 42 and the balls 10 received in the ball pockets 8.

FIG. 6 shows the—completed or fully assembled—ball bearing 40 having the ball bearing inner race 42, the ball bearing outer race 44, and the ball bearing cage 2—guided by the ball bearing inner race shoulder 78—(according to the second embodiment) as well as the balls 10 received in the ball pockets 8.

'Ball Bearing Cage 2 Having a Conical External Face 30 and a Concave Cup Base 70'), FIGS. 7 to 9

FIGS. 7 to 9 show (likewise in the various functional groups, that is to say only the ball bearing cage 2 by itself (FIG. 7), the ball bearing cage 2 having the inner race 42 (FIG. 8), and the ball bearing cage 2 installed in a single-row radial grooved ball bearing 40 (FIG. 9)) a third embodiment of the ball bearing cage 2 having a conical external face 28 and a concave cup base 70.

As is shown in FIGS. 7 to 9, the ball bearing cage 2 according to this third embodiment or the webs 18 thereof has/have a radial external face 30 which is conical in the axial direction 14, here having a cone angle 52 of approximately 10°, for example.

On account thereof, the cup lugs can bend outward due to centrifugal forces, caused by the rotating speed, which arise in the ball bearing and it can be prevented that the cup lugs which in this instance are bent outward come into contact with a shoulder or a raceway of the outer race.

As is shown in FIGS. 7 to 9, the ball bearing cage 2 according to this third embodiment furthermore provides the cup base 54 which has the curved ('concave') face 70 which corresponds to a ball surface of the ball 10 to be received or which has been received in the ball pocket 8.

FIG. 8 shows the ball bearing cage 2—guided by the ball bearing inner race shoulder 78—according to this third embodiment conjointly with the associated ball bearing inner race 42 and the balls 10 received in the ball pockets 8.

FIG. 9 shows the—complete or fully assembled—ball bearing 40 having the ball bearing inner race 42, the ball bearing outer race 44, and the ball bearing cage 2—guided by the ball bearing inner race shoulder 78—(according to the third embodiment) as well as the balls 10 received in the ball pockets 8.

'Ball Bearing Cage 2 Having a Conical External Face 30 and a Straight Cup Base 66', FIGS. 10 to 12

FIGS. 10 to 12 show (likewise in the various functional groups, that is to say only the ball bearing cage 2 by itself (FIG. 10), the ball bearing cage 2 having the inner race 42 (FIG. 11), and the ball bearing cage 2 installed in a single-row radial grooved ball bearing 40 (FIG. 12)) a fourth embodiment of the ball bearing cage 2 having a conical external face 30 and a straight cup base 66.

As is shown in FIGS. 10 to 12, the ball bearing cage 2 according to this fourth embodiment or the webs 18 thereof also has/have the radial external face 30 which is conical in the axial direction 14, here also having a cone angle 52 of approximately 10°, for example.

As is shown in FIGS. 10 to 12, the ball bearing cage 2 according to this fourth embodiment furthermore provides a cup base 54 which has the flat ('straight') face 66.

FIG. 11 shows the ball bearing cage 2—guided by the ball bearing inner race shoulder 78—according to this third embodiment conjointly with the associated ball bearing inner race 42 and the balls 10 received in the ball pockets 8.

FIG. 12 shows the—completed or fully assembled—ball bearing 40 having the ball bearing inner race 42, the ball bearing outer race 44, and the ball bearing cage 2—guided by the ball bearing inner race shoulder 78—(according to the third embodiment) as well as the balls 10 received in the ball pockets 8.

Production of the Ball Bearing Cage 2 by Means of Injection-Molding 36

A great advantage of all these ball bearing cages 2 lies in particular in the production process thereof.

Figure 13:
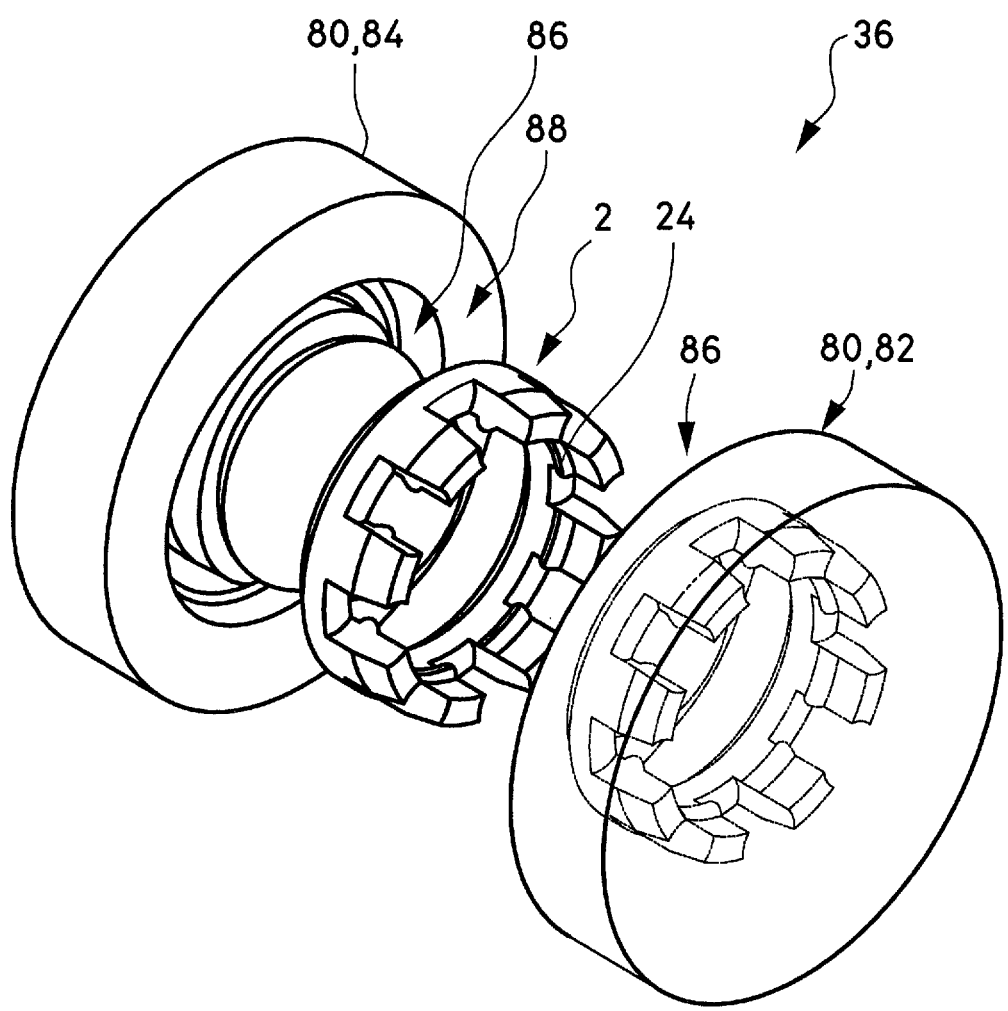
FIG. 13 shows a two-part injection-molding tool (upper part/lower part) for producing a ball bearing cage (here in an exemplary manner according to the fourth embodiment, perspective view)
Figure 14:
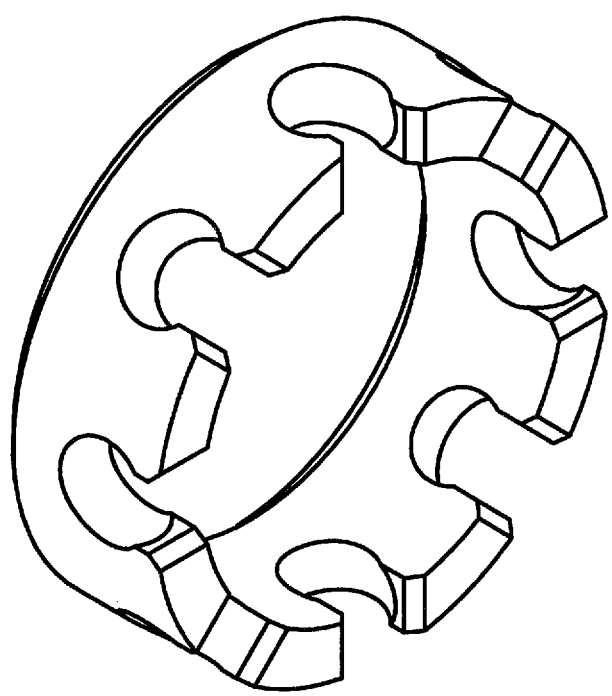
FIG. 14 shows a (single-part) plastics material (snap-fit) cage of a ball bearing in the standard design.

As is shown in FIG. 13, when the ball bearing cage 2 is produced by injection-molding 36, the injection-molding tool 80, in this case a 2-part injection-molding tool 80 having an upper part 82 and a lower part 84 which by way of a separating joint 88 is connected, or able to be connected to the upper part 82, can be embodied in a very simple manner—by virtue of the cage design of the ball bearing cage 2.

As is highlighted by FIG. 13, the upper part and the lower part joined together by way of the separating joint 88 here configure the negative mold 86 of the ball bearing cage 2.

As is also highlighted in FIG. 13, the guide portion 24 here lies in the separating joint 88 of the 2-part injection-molding tool 80 such that complete demolding of the injection-molded part can take place in a form-fitting manner by opening the tool upper part 82.

Although the invention has been illustrated and described in more detail by the preferred exemplary embodiment or embodiments, the invention is not limited by the disclosed examples and other variations may be derived therefrom by the person skilled in the art without departing from the scope of protection of the invention.

LIST OF REFERENCE SIGNS

2 Ball bearing cage
4 Annular body/cage back
6 Circumferential direction of the ball bearing cage 2 or of the ball bearing 40
8 Ball pocket
10 Ball
12 Ball diameter
14 Axial direction, axially
16 Axial length of a web 18
18 Web
20 Spacing, length of arc (between two neighboring webs 18), (mean) web spacing, (mean) ball pocket width
22 Width of a web 18, extent of a web 18 along an arc (length of arc) in the circumferential direction 6
24 Guide portion, rib
26 Radial external side/external face of a web 18
28 Cylindrical radial external face
30 Conical radial external face
32 Radial internal side/internal face of a web 18
34 External circumference of the ball bearing cage 2 or of the ball bearing 40
36 Injection-molding
38 Internal circumference of the ball bearing cage 2 or of the ball bearing 40
40 Ball bearing, (single-row) radial grooved ball bearing
42 Ball bearing inner race, inner raceway
44 Ball bearing outer race, outer raceway
46 Running groove of the ball bearing inner race, inner raceway 42
48 Running groove of the ball bearing outer race, outer raceway 44
50 Ball set
52 Cone angle
54 Cup base
56 Radial direction
58 Axial center of a ball pocket 8, mean axial ball pocket depth
60 Mean radial height of a web 18
62 Center point M of the ball bearing cage 2 or of the ball bearing 40
64 Depth of a ball pocket 8 (in the axial direction 14), axial 14 extent of a ball pocket 8
66 Flat/straight face of a cup base 54
68 Radius R
70 Curved/concave face of a cup base 54
72 Spacing, length of arc (between two neighboring webs 18 of the ball bearing cage 2 on the external circumference of the latter)
74 Spacing, length of arc (between two neighboring webs 18 of the ball bearing cage 2 on the internal circumference of the latter)
76 External circumference of the inner raceway 42
78 Inner race shoulder of the ball bearing inner race/inner raceway 42 guided by the (ball bearing) inner race shoulder
80 (Two-part) injection-molding tool
82 First tool part, upper part
84 Second tool part, lower part
86 Cavity, negative mold
88 Separating joint
90 Ball pocket opening (at the web ends 92), 'free' spacing at the web ends 92
92 (Free) web end
94 First, (axially) 'proximal' shoulder
96 Second, (axially) 'distal' shoulder
98 Excess

The invention claimed is:
1. A ball bearing, comprising:
a ball bearing inner race and a ball bearing outer race;

a multiplicity of balls having a predefinable ball diameter;
a ball bearing cage including:
- a radially encircling annular body;
- a plurality of webs disposed on said annular body, said webs being distributed in a circumferential direction substantially uniformly and said webs protruding axially by a predefinable axial length;
- said webs configuring a plurality of unilaterally axially open ball pockets for each receiving a respective one of said balls, said axial length of said webs being at least equal to the ball diameter, said axial length of said webs protruding axially beyond said balls and said webs being guided on an axially proximal shoulder and an axially distal shoulder of a ball bearing inner race of said ball bearing races; and
- at least one of said webs being formed with a guide portion configured for engaging with a running groove of said ball bearing inner race or of said ball bearing outer race.

2. The ball bearing according to claim 1, wherein said guide portion is an elevation that extends in the circumferential direction.

3. The ball bearing according to claim 2, wherein said elevation is a rib that extends substantially across the entire width of said at least one web in the circumferential direction on a radially external side or a radially internal side of said web.

4. The ball bearing according to claim 1, wherein said webs have a radially external face which is cylindrical in an axial direction, or a radially external face which is conical in the axial direction.

5. The ball bearing according to claim 4, wherein said webs are conical with a cone angle between approximately 2° and approximately 20°.

6. The ball bearing according to claim 4, wherein said webs are conical with a cone angle between approximately 7° and approximately 12°.

7. The ball bearing according to claim 1 configured for a dental apparatus.

8. The ball bearing according to claim 7, wherein the dental apparatus is a dental turbine.

9. The ball bearing according to claim 1, wherein said guide portion is on a radially external side of said at least one web or said guide portion is on a radially internal side of said at least one web.

10. The ball bearing according to claim 1, wherein said guide portion is integrally formed in one piece with said at least one web, at an axial position on said web that enables the ball bearing cage to be guided with an axial clearance in a ball bearing.

11. The ball bearing according to claim 1, wherein in each of a plurality of said webs said guide portion is configured as to be positionally identical, having substantially identical webs, or wherein every fourth or every third or every other of said webs has a guide portion that is positionally identical, having substantially identical webs.

12. The ball bearing according to claim 1, composed at least in part of a plastics material selected from the group consisting of polyether ether ketone (PEEK), polyether ketone (PEK), polyphenylene sulfide (PPS), polyphenyl sulfone (PPSU), polyamide imide (PAI), polyimide (PI), phenol formaldehyde resin (PF), and phenol formaldehyde resin (PF) reinforced with a woven cotton fabric.

13. The ball bearing according to claim 1, which comprises a cup base formed on said radially encircling, annular body between in each case two webs that neighbor one another in the circumferential direction, said cup base having a flat or curved face.

14. The ball bearing according to claim 1, formed by a process selected from the group consisting of subtractive shaping, additive manufacturing, 3D-printing, and injection-molding.

15. The ball bearing according to claim 1, configured for a single-row radial grooved ball bearing.

16. The ball bearing according to claim 1, wherein said guide portion is configured on a radially internal side of said at least one web and engages with a running groove of said ball bearing inner race.

17. The ball bearing according to claim 1, wherein said ball diameter of said balls is less than 5 mm.

* * * * *